(12) United States Patent
Jongebloed et al.

(10) Patent No.: US 9,440,532 B1
(45) Date of Patent: Sep. 13, 2016

(54) TRANSFER CASE LUBRICATION SYSTEM WITH DISENGAGABLE PUMP

(71) Applicant: BorgWarner Inc., Auburn Hills, MI (US)

(72) Inventors: Jesse Jongebloed, Clawson, MI (US); Michael Palazzolo, Madison Heights, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/857,296

(22) Filed: Sep. 17, 2015

(51) Int. Cl.
*B60K 17/342* (2006.01)
*B60K 17/346* (2006.01)
*F16H 57/04* (2010.01)
*B60K 17/34* (2006.01)
*F16D 27/04* (2006.01)

(52) U.S. Cl.
CPC ............. *B60K 17/34* (2013.01); *B60K 17/342* (2013.01); *B60K 17/3467* (2013.01); *F16D 27/04* (2013.01); *F16H 57/043* (2013.01); *F16H 57/0434* (2013.01)

(58) Field of Classification Search
None
See application file for complete search history.

(56) References Cited

U.S. PATENT DOCUMENTS

| 4,984,663 | A | * | 1/1991 | Kato | B60K 17/35 180/251 |
| 5,620,072 | A | * | 4/1997 | Engle | B60K 17/342 180/247 |
| 8,491,289 | B2 | | 7/2013 | Showalter | |
| 8,500,590 | B2 | | 8/2013 | Showalter | |

FOREIGN PATENT DOCUMENTS

WO   WO 2009/035678 A1 * 3/2009 ........... B60K 17/344

* cited by examiner

*Primary Examiner* — Richard Lorence
(74) *Attorney, Agent, or Firm* — Young Basile Hanlon & MacFarlane P.C.

(57) ABSTRACT

A lubrication system (300) for a transfer case (200) includes a shaft (302) having a lubricant inlet port (306) and a hollow bore (304) for transporting lubricant within the shaft (302), a pump (310) having a pump housing (312) and one or more pumping elements (318) that are disposed in the pump housing (312), and a clutch assembly (330). The clutch assembly 330 has an engaged position in which rotational force from the shaft (302) is transferred to the one or more pumping elements (318) to cause operation of the pump (310), and a disengaged position in which rotational force from the shaft (302) is not transferred to the one or more pumping elements (318). An actuator (370, 410) is operable to cause the clutch assembly (330) to move between the engaged position and the disengaged position.

15 Claims, 4 Drawing Sheets

US 9,440,532 B1

TRANSFER CASE LUBRICATION SYSTEM WITH DISENGAGABLE PUMP

CROSS-REFERENCE TO RELATED APPLICATIONS

Not applicable.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft and a secondary output shaft, with the secondary output shaft being driven selectively using a clutch. In addition, two speed transfer cases provide gear reduction to allow operation in a high range, which is typically a 1:1 drive ratio, or a low range, such as a 2:1 drive ratio.

Many of the components in a transfer case require lubrication. One transfer case design includes a pump that is mounted on one of the input shaft or the primary output shaft. The pump delivers lubricant to the various components of the transfer case through an axial bore that is formed through the input shaft and/or the output shaft. Supply ports are formed through the input shaft and/or the output shaft at locations where lubrication is needed, such that the lubricant flows from the pump, through the axial bore, and out of the supply ports. This arrangement is effective but offers little control over the rate of lubricant flow to specific components.

SUMMARY

One aspect of the disclosed embodiments is a lubrication system for a transfer case. The lubrication system includes a shaft having a lubricant inlet port and a hollow bore for transporting lubricant within the shaft. A pump has a pump housing and one or more pumping elements that are disposed in the pump housing. A clutch assembly has an engaged position in which rotational force from the shaft is transferred to the one or more pumping elements to cause operation of the pump, and a disengaged position in which rotational force from the shaft is not transferred to the one or more pumping elements. An actuator is operable to cause the clutch assembly to move between the engaged position and the disengaged position.

Another aspect of the disclosed embodiments is a transfer case for a vehicle. The transfer case includes a primary shaft assembly and a secondary shaft assembly. The primary shaft assembly has an input shaft and a primary output shaft. The primary shaft assembly has a hollow bore, at least one input port in communication with the hollow bore, and at least one outlet port in communication with the hollow bore. The transfer case also includes a secondary output shaft and a transfer clutch that is operable to transfer power from the primary shaft assembly to the secondary output shaft when the transfer clutch is in an engaged position. A pump has a pump housing and one or more pumping elements that are disposed in the pump housing. A pump clutch assembly has an engaged position in which rotational force from the primary shaft assembly is transferred to the one or more pumping elements to cause operation of the pump, and a disengaged position in which rotational force from the primary shaft assembly is not transferred to the one or more pumping elements. The pump clutch assembly includes a first clutch rotor that is disposed on the primary shaft assembly and is connected to the one or more pumping elements such that rotation of the first clutch rotor causes operation of the one or more pumping elements of the pump, and a second clutch rotor that rotates in response to rotation of the primary shaft assembly. A biasing element is operable to apply a spring force to the second clutch rotor. An electromagnetic coil is operable to produce a magnetic field when energized to cause the pump clutch assembly to move between the engaged position and the disengaged position, wherein the electromagnetic coil is connected to the first clutch rotor, at least part of the second clutch rotor is formed from a ferromagnetic material, the second clutch rotor slides axially into engagement with the first clutch rotor to define the engaged position of the pump clutch assembly in response to energization of electromagnetic coil and slides axially out of engagement with the first clutch rotor in response to de-energization of the electromagnetic coil to define the disengaged position of the pump clutch assembly.

BRIEF DESCRIPTION OF THE DRAWINGS

The description herein makes reference to the accompanying drawings, wherein like referenced numerals refer to like parts throughout several views, and wherein.

DETAILED DESCRIPTION

The disclosure herein is directed to a lubrication system for a transfer case in which one or more pumping elements are configured to be connected to and disconnected from a rotating shaft. This allows the pump to be disengaged such that it stops pumping a lubricant under certain conditions, which reduces the parasitic loss associated with driving the pumping elements using the rotating shaft.

Figure 1:
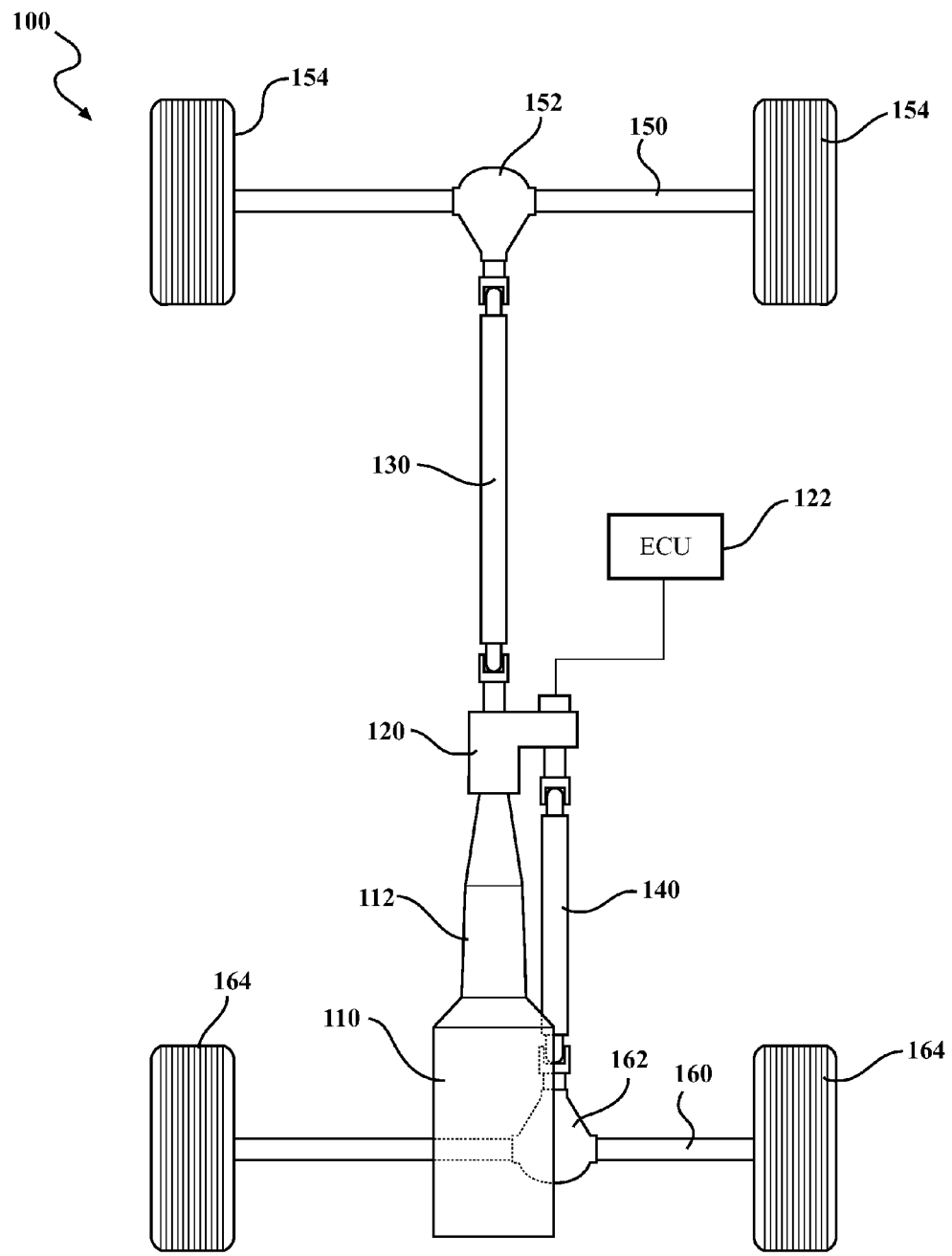
FIG. 1 is a plan view illustration showing a drivetrain that includes a transfer case.

FIG. 1 shows a drivetrain 100 for a four-wheel drive vehicle. The drivetrain 100 includes an engine 110 that is coupled to a transmission 112. The engine 110 is the prime mover of the drivetrain 100 and can be, as examples, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140.

The transfer case 120 can, in some implementations, include components that allow the transfer case to perform a mode shift between two or more different modes. For example, the transfer case 120 can allow operation in a rear-wheel drive mode, in which the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft and the front driveshaft 140 is the secondary driveshaft. In other implementations, the front driveshaft 140 is the primary driveshaft and the rear driveshaft 130 is the secondary driveshaft, and the transfer case 120 performs a mode shift between a front-wheel drive mode and a four-wheel drive mode. In other implementations the transfer case 120 does not include components that allow a mode shift, and the transfer case 120 constantly provides driving power to both of the rear driveshaft 130 and the front driveshaft 140.

The transfer case 120 can allow a range shift that selectively provides gear reduction to the rotational output of the transfer case 120. For example, the transfer case can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically such as by a driver-operated lever that is mechanically connected to a component of the transfer case 120.

The rear driveshaft 130 provides driving power to a rear axle 150 via a rear differential 152. The rear axle 150 can be, as examples, a solid axle or a pair of independent half axles. The rear axle 150 provides driving power to a pair of rear wheels 154 that are fitted with tires.

The front driveshaft 140 provides driving power to a front axle 160 via a front differential 162. The front axle 160 can be, as examples, a solid axle or a pair of independent half axles. The front axle 160 provides driving power to a pair of front wheels 164 that are fitted with tires.

Figure 2:
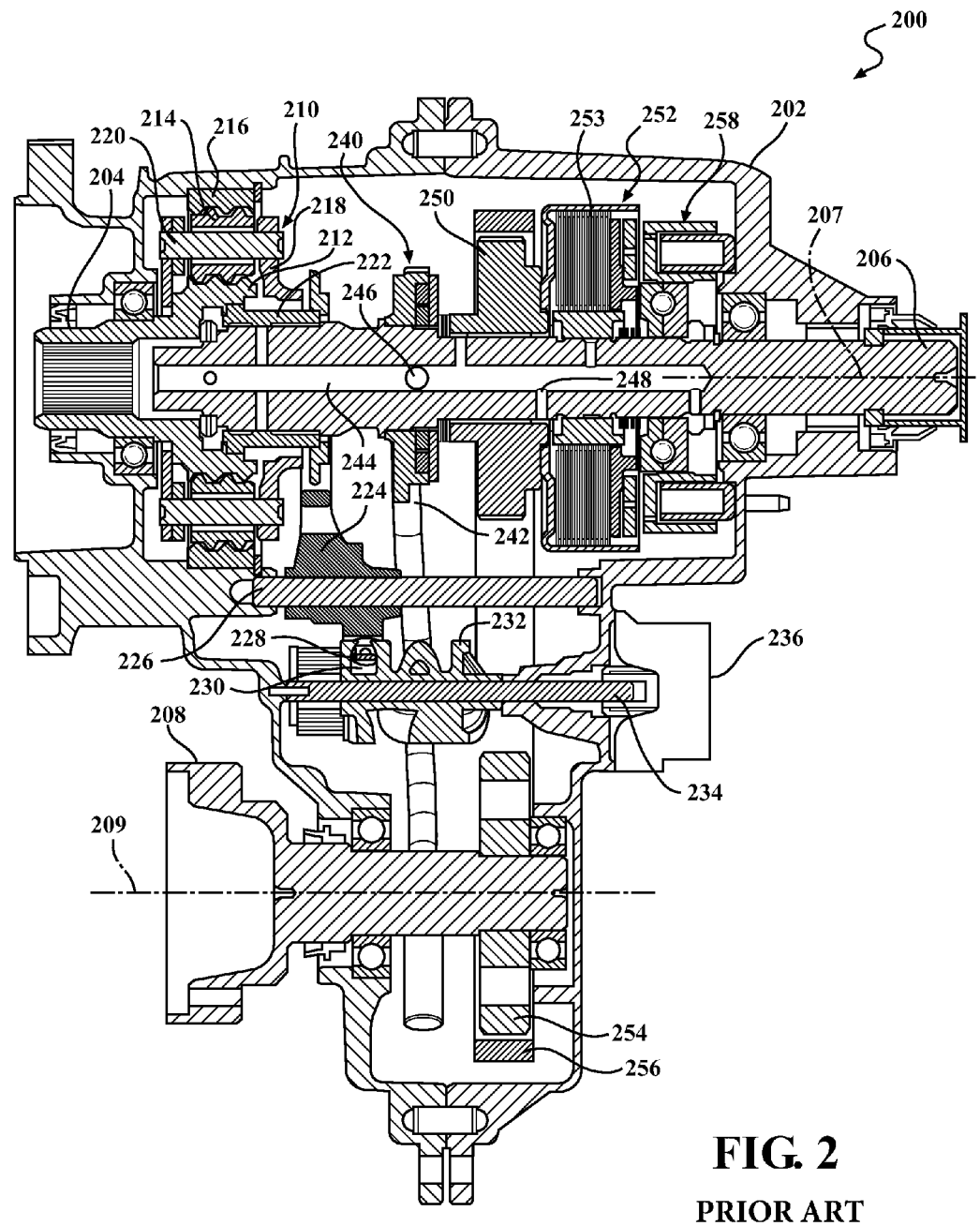
FIG. 2 is a cross-section illustration showing a transfer case.

FIG. 2 shows the transfer case 200, which is conventional. The transfer case 200 includes a housing 202, an input shaft 204 that extends out of the housing 202, a primary output shaft 206 that extends out of the housing 202, and a secondary output shaft 208 that extends out of the housing 202. The input shaft 204 and the primary output shaft 206 extend along a first axis 207. The secondary output shaft 208 extends along a second axis 209 which is, in this example, parallel to the first axis 207.

The input shaft 204 is at least partially hollow, and the primary output shaft 206 extends into the hollow interior of the input shaft 204. The input shaft 204 can be connected to the primary output shaft either directly, or via a gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch 222 is utilized to engage and disengage the gear reduction mechanism 210. In a first position of the dog clutch 222, the dog clutch 222 engages the input shaft 204 and the primary output shaft 206 directly, which establishes a 1:1 drive ratio and does not utilize the gear reduction mechanism 210. In a second position of the dog clutch 222 (not shown), the dog clutch 222 is shifted axially away from the input shaft 204 and instead engages the planet carrier 218 and the primary output shaft 206. Driving power is thus routed through the gear reduction mechanism 210 with the planet carrier rotating slower than the input shaft 204 to establish a drive ratio such as 2:1.

The dog clutch 222 is moved between its first and second positions by a first selector fork 224, which moves axially along a selector shaft 226. A first cam follower 228 is formed on the first selector fork 224. The first cam follower 228 is disposed in a first groove 230 formed on an exterior surface of a barrel cam 232. The barrel cam 232 is disposed on a rotatable shaft 234 that is rotated by an electric motor 236 in response to control signals from a controller such as the ECU 122 of FIG. 1.

The transfer case 200 includes a pump 240 for pumping a lubricant (not shown) to components of the transfer case 200 that require lubrication. The pump 240 is arranged on the primary output shaft 206 and a pump mechanism of the pump 240 is driven by the primary output shaft 206. The pump 240 can be, for example, a gerotor pump. Other types of pumping mechanisms can be utilized. At least a portion of the housing 202 can serve as a sump, and the pump 240 can include a conduit 242 that extends into the sump area of the housing 202.

To route lubrication to various components of the transfer case 200, the primary output shaft includes an axially extending hollow bore 244 and a plurality of lubricant ports, each of which extends radially through the primary output shaft 206. The plurality of lubricant ports can include an inlet port 246 and one or more outlet ports 248. The inlet port 246 is aligned with an outlet of the pump 240 and receives the lubricant under pressure from the pump 240. The outlet ports 248 are positioned along the primary output shaft 206 near components that require lubrication. The lubricant is pressurized by the pump 240, travels through the inlet port 246, along the hollow bore 244, and out of one of the outlet ports 248 to lubricate portions of the transfer case 200. Excess lubricant then drains to the sump area inside the housing 202.

A first sprocket 250 is arranged on the primary output shaft 206 and is connected to the primary output shaft by a clutch 252. A second sprocket 254 is arranged on the secondary output shaft 208 and connected for rotation in unison, such as by splines. The first sprocket 250 and the second sprocket 254 are connected by a chain 256, such that the second output shaft is driven by the primary output shaft 206 via the first sprocket 250, the chain 256 and the second sprocket 254 when the clutch 252 is engaged. The clutch 252 includes, for example, a clutch pack 253 of interleaved plates, with the clutch being engaged when pressure is applied to the clutch pack 253 by an electromagnetic actuator 258. In the illustrated example, the clutch 252 can allow active control of distribution of power between the primary output shaft 206 and the secondary output shaft 208. In alternative implementations, different types of clutches and other mechanisms can be utilized to control transfer of power to the secondary output shaft 208. Thus, for example, the transfer case 200 could be configured to simply couple or decouple the first sprocket 250 with respect to the primary output shaft 206, as in well-known part-time/manual transfer cases.

Figure 3:
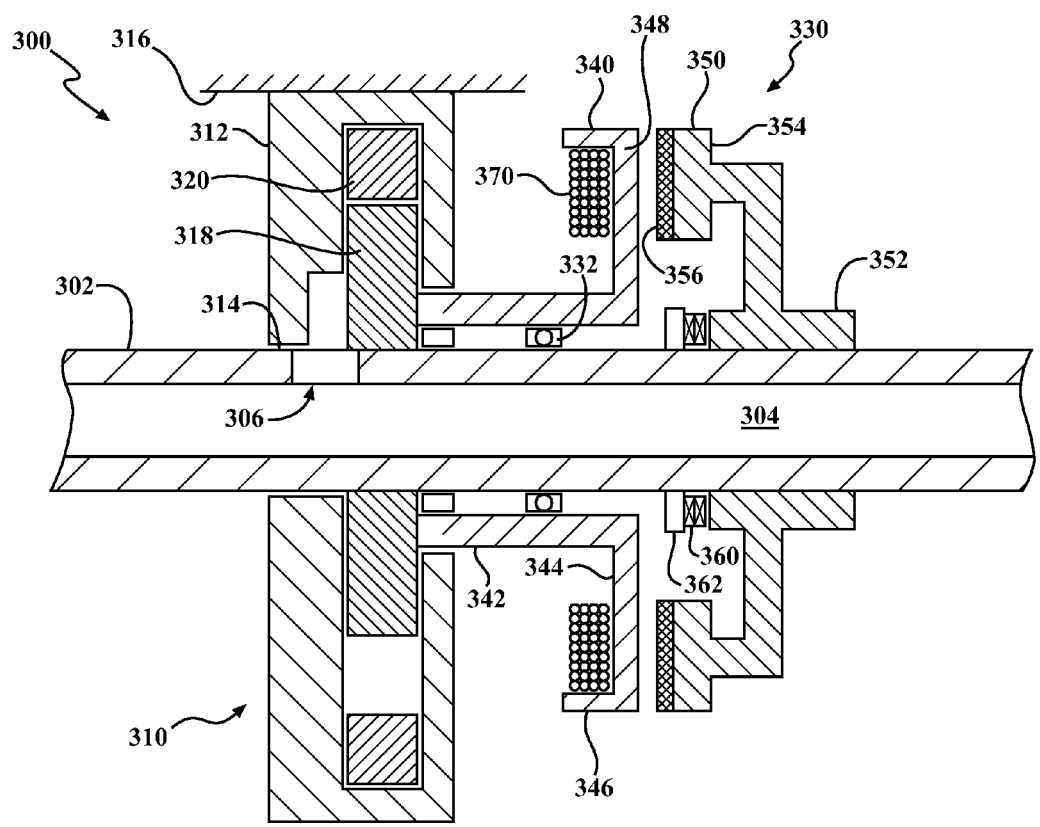
FIG. 3 is an illustration of a lubrication system for a transfer case according to a first example.

FIG. 3 shows a lubrication system 300 that includes a pump 310 that is located on and driven by a shaft 302. The lubrication system 300 can be implemented in a transfer case of any suitable configuration. For example, the lubrication system 300 can be implemented in the transfer case 200 in place of the pump 240. Thus, the lubrication system 300 could be disposed on one of the input shaft 204 or the primary output shaft 206 of the transfer case 200.

The shaft 302 is a rotating member that has a hollow bore 304 for transporting lubricant within the shaft 302 from one or more fluid inlets 306 to one or more fluid outlets (not shown). The one or more fluid inlets 306 and the one or more fluid outlets extend radially through the shaft 302.

The pump 310 includes a pump housing 312. The shaft 302 passes through the pump housing through an aperture 314 that extends through the pump housing 312. The pump housing 312 is mounted in a manner that restrains the pump housing 312 from rotating in response to rotation of the shaft 302. For instance, the pump housing 312 can be connected to a fixed structure 316 such that the pump housing 312 does not rotate in response to rotation of the shaft 302. In implementations where the lubrication system 300 is implemented in a transfer case such as the transfer case 200, the pump housing 312 can be fixed to the housing 202.

The pump 310 includes one or more pumping elements that are disposed in the pump housing 312 and are operated by rotational force provided by rotation of the shaft 302. In the illustrated example, the pump 310 is a gerotor pump, and the one or more pumping elements include an inner pump rotor 318 that is located on the shaft 302, and an outer pump rotor 320, which is an annular member that extends around the inner pump rotor 318. As in conventional gerotor pumps, the inner pump rotor 318 includes a first plurality of teeth and the outer pump rotor 320 includes a second plurality of teeth in greater number than the first plurality of teeth. Typically, the outer pump rotor 320 will include teeth in a number that is one greater than the number of teeth on the inner pump rotor 318. Rotation of the inner pump rotor 318 causes rotation of the outer pump rotor 320 through meshing of their respective teeth, which creates a low pressure inlet region where the teeth diverge and a high pressure outlet region where the teeth converge. The inlet region can be in communication with a source of fluid (e.g. lubricant such as transmission fluid or oil) and the outlet region can be in communication with at least one of the fluid inlets 306 of the shaft 302 to pump pressurized fluid into the hollow bore 304 of the shaft via the fluid inlets 306. As will be explained further herein the pumping elements of the pump 310 are not driven directly by the shaft 302. Instead, the inner pump rotor 318 is disposed on the shaft 302 such that the shaft may rotate independent of rotation of the inner pump rotor 318.

In order to provide a rotational input force to the pump 310, the lubrication system includes a clutch assembly 330. The clutch assembly 330 has an engaged position in which rotational force is transferred from the shaft 302 to the inner pump rotor 318, and a disengaged position in which rotational force is not transferred from the shaft 302 to the inner pump rotor 318.

The clutch assembly 330 has a first clutch rotor 340 and a second clutch rotor 350. The first clutch rotor 340 rotates in unison with the inner pump rotor 318, while the second clutch rotor 350 rotates in unison with the shaft 302. The second clutch rotor 350 causes rotation of the first clutch rotor 340 in the engaged position but does not cause rotation of the first clutch rotor 340 in the disengaged position by virtue of a small air gap by which the first clutch rotor 340 is spaced from the second clutch rotor 350. The clutch assembly 330 may further define a fully engaged position in which the first clutch rotor 340 and the second clutch rotor 350 rotate in unison, and a partially engaged position in which the second clutch rotor 350 contacts the first clutch rotor 340 but slips with respect to it such that the first clutch rotor 340 rotates slower than the second clutch rotor 350.

The first clutch rotor 340 is disposed on the shaft 302 such that the shaft 302 may rotate independent of the first clutch rotor 340. In the illustrated example, the first clutch rotor 340 is supported with respect to the shaft 302 by one or more bearings 332. The second clutch rotor can include a cylindrical portion 342 in the form of a tube with the shaft 302 passing through it. The cylindrical portion 342 is connected to the inner pump rotor 318 of the pump 310, and extends out of the pump housing 312 axially along the shaft 302. Opposite the inner pump rotor 318, the first clutch rotor 340 can include a disk portion 344 that extends radially outward from the cylindrical portion 342. In the illustrated example, the disk portion 344 is planar, lies in a plane that is perpendicular to the longitudinal axis of the shaft 302, and has an axial face 348 that is oriented toward the second clutch rotor 350. In the illustrated example, the first clutch rotor also includes an annular rim 346 that extends from the outer end of the disk portion 344 and is concentric to the cylindrical portion 342.

The second clutch rotor 350 is positioned along the shaft 302 such that the first clutch rotor 340 is located between the pump 310 and the second clutch rotor 350. The second clutch rotor 350 is mounted to the shaft 302 such that it rotates substantially in unison with the shaft 302, but is able to slide axially along the shaft 302 at least over a limited distance. The distance by which the second clutch rotor 350 is able to slide axially along the shaft 302 is at least sufficient to allow the second clutch rotor to move into and out of engagement with the first clutch rotor.

The second clutch rotor 350 includes a cylindrical portion 352 that is seated on the shaft 302 such that the shaft 302 passes through it. The cylindrical portion 352 can be connected to the shaft 302 by splines (not shown) to enforce uniform rotation with the shaft 302 while permitting axial sliding, or by any other suitable structure. A disk portion 354 is connected to and supported by the cylindrical portion 352. In the illustrated example, the disk portion defines a maximum diameter for the second clutch rotor 350 that is similar to a maximum diameter for the first clutch rotor 340, as defined by the disk portion 344 and/or the annular rim 346 of the second rotor.

An axial face 356 of the second clutch rotor 350 faces the first clutch rotor 340. Optionally, the axial face 356 of the second clutch rotor 350 can be defined by a high friction material.

The lubrication system 300 includes a biasing element that is operable to apply a spring force to the second clutch rotor 350. In the illustrated example, the biasing element is an annular member that is seated on the shaft 302, such as a wave spring 360 that exerts a spring force on the second clutch rotor 350 when compressed by engagement of the cylindrical portion 352 of the second clutch rotor 350 with the wave spring 360. Thus, the wave spring 360 can be a compression spring. The wave spring 360 is located on the shaft 302 between the second clutch rotor 350 and a stop member 362, such as a surface defined on the shaft 302 or a stop ring that is seated on the shaft 302 such that it cannot move axially with respect to the shaft 302. In the illustrated example, the stop member 362 is located on the shaft 302 between the first clutch rotor 340 and the second clutch rotor 350. Thus, the wave spring 360 urges the second clutch rotor 350 axially away from the first clutch rotor 340 toward the disengaged position of the clutch assembly 330 such that the small air gap is defined between the axial face 348 of the first clutch rotor 340 and the axial face 356 of the second clutch rotor 350.

To move the clutch assembly 330 between the disengaged position and the engaged position, the clutch assembly 330 includes an actuator in the form of an electromagnetic coil 370. The electromagnetic coil 370 receives electricity from an external power source (not shown) that can be energized and de-energized. In the illustrated example, the electromagnetic coil 370 is disposed on the first clutch rotor 340 on the disk portion 344 opposite the axial face 348, such that the electromagnetic coil 370 is directly behind the axial face 348 of the first clutch rotor 340.

In one implementation, the electromagnetic coil 370 can be energized to create a magnetic field that attracts ferromagnetic objects. In this implementation, all or part of the second clutch rotor 350 is formed from a ferromagnetic material. Thus, when the electromagnetic coil 370 is energized, the second clutch rotor 350 is moved axially toward the first clutch rotor 340 as a result of the magnetic field, while compressing the wave spring 360. When the electromagnetic coil 370 is de-energized, magnetic attraction ceases, and the biasing force applied to the second clutch rotor 350 by the wave spring 360 moves the second clutch rotor axially along the shaft 302 to place the clutch assembly 330 in the disengaged position. Thus, in this implementation, the clutch assembly 330 is in the disengaged position when the electromagnetic coil 370 is de-energized, and the clutch assembly 330 is in the engaged position when the electromagnetic coil 370 is energized.

In an alternative implementation, the operating relationship between energization of the electromagnetic coil 370 and engagement of the clutch assembly 330 can be reversed. In this implementation, the first clutch rotor 340 is formed from a ferromagnetic material and magnets (not shown) are disposed on the second clutch rotor 350. When the electromagnetic coil 370 is not energized, the magnets on the second clutch rotor 350 are attracted to the first clutch rotor 340 to move the second clutch rotor 350 into engagement with the first clutch rotor 340 to place the clutch assembly 330 in the engaged position. The electromagnetic coil 370 is configured such that the polarity of the magnetic field it produces cancels the magnetic attractive force exerted on the first clutch rotor 340 by the magnets on the second clutch rotor 350. The magnetic attraction is diminished sufficiently such that the biasing force of the wave spring 360 is no longer overcome. As a result, the second clutch rotor 350 is moved away from the first clutch rotor 340 by the wave spring 360 to place the clutch assembly 330 in the disengaged position. Thus, in this implementation, the clutch assembly 330 is in the engaged position when the electromagnetic coil 370 is de-energized, and the clutch assembly 330 is in the disengaged position when the electromagnetic coil 370 is energized.

In operation, a determination is made as to whether or not to operate the pump 310 of the lubrication system 300. The determination can be made by a controller such as the ECU 122 of the drivetrain 100 based on, for example, operating conditions of the drivetrain 100. If the pump is to be operated, the clutch assembly 330 is moved to the engaged position by, for example, energizing the electromagnetic coil 370. This moves the second clutch rotor 350 axially into engagement with the first clutch rotor 340. As a result of this engagement, the first clutch rotor and the pumping elements of the pump 310 begin to rotate. In some implementations, full engagement results, and the rotational speed of the first clutch rotor 340 matches the rotational speed of the second clutch rotor 350. Rotation of the first clutch rotor 340 causes rotation of the pumping elements of the pump 310, which results in fluid being pumped by the pump 310. When operation is no longer needed, the electromagnetic coil 370 is de-energized, and the second clutch rotor 350 is moved out of engagement with the first clutch rotor 340 by the wave spring 360.

Figure 4:
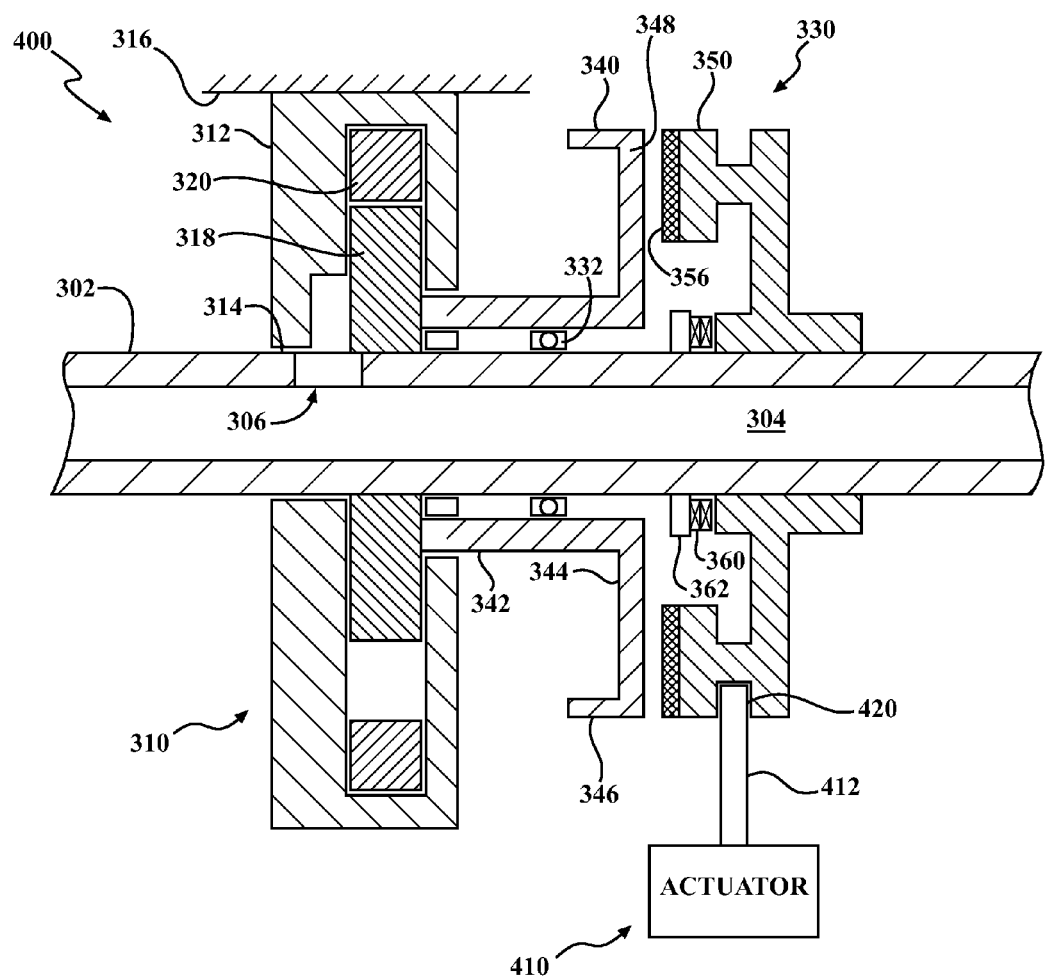
FIG. 4 is an illustration of a lubrication system for a transfer case according to a second example.

FIG. 4 shows a lubrication system 400 according to an alternative implementation. The lubrication system 400 is similar to the lubrication system 300 and includes all elements of the lubrication system 300 except as noted herein.

The lubrication system 400 omits the electromagnetic coil 370 that was described in connection with the lubrication system 300. To move the clutch assembly 330 between the engaged position and the disengaged position, the lubrication system 400 includes an actuator 410 that has a moving member 412. The moving member 412 is engaged with the second clutch rotor 350 to move the second clutch rotor 350. In the illustrated example, the moving member 412 is seated in an annular groove 420 formed on an outer periphery of the second clutch rotor 350.

The actuator 410 can be operable to move the second clutch rotor 350 in a single axial direction only, in which case the wave spring 360 acts opposite the actuator 410, or in both axial directions, in which case the wave spring 360 and the stop member 362 can be omitted.

The actuator 410 can be any suitable type of actuator, such as an electrical actuator, a hydraulic actuator, or a pneumatic actuator. In one implementation, the moving member 412 is a shift fork that is moved in the axial direction of the shaft 302 by a barrel cam that is rotated by an electrical motor, such as the barrel cam 232 of the transfer case 200 and the electric motor 236 of the transfer case 200.

Operation of the lubrication system 400 is similar to operation of the lubrication system 300, as previously described.

While the disclosure has been made in connection with what is presently considered to be the most practical and preferred embodiment, it should be understood that the disclosure is intended to cover various modifications and equivalent arrangements.

The invention claimed is:
1. A lubrication system (300) for a transfer case (120, 200), comprising:
   a shaft (302) having a lubricant inlet port (306) and a hollow bore (304) for transporting lubricant within the shaft (302);
   a pump (310) having a pump housing (312) and one or more pumping elements (318) that are disposed in the pump housing (312);
   a clutch assembly (330) having an engaged position in which rotational force from the shaft (302) is transferred to the one or more pumping elements (318) to cause operation of the pump (310), and a disengaged position in which rotational force from the shaft (302) is not transferred to the one or more pumping elements (318);
   a biasing element (360) that is operable to apply a spring force to the clutch assembly (330); and
   an actuator (370, 410) that is operable to apply a force to the clutch assembly (330) in opposition to the spring force applied by the biasing element (360), wherein the biasing element (360) and the actuator (370, 410) cooperate to cause the clutch assembly (330) to move between the engaged position and the disengaged position.

2. The lubrication system (300) of claim 1, wherein the actuator is an electromagnetic coil (370) that is operable to produce a magnetic field when energized and energization of the electromagnetic coil (370) causes the clutch assembly (330) to move from the engaged position toward the disengaged position.

3. The lubrication system (300) of claim 1, wherein the actuator is an electromagnetic coil (370) that is operable to produce a magnetic field when energized and energization of the electromagnetic coil (370) causes the clutch assembly (330) to move from the disengaged position toward the engaged position.

4. The lubrication system (300) of claim 1, wherein the clutch assembly (330) includes a first clutch rotor (340) that is disposed on the shaft (302) and is connected to the one or more pumping elements (318) such that rotation of the first clutch rotor (340) causes operation of the one or more pumping elements (318) of the pump (310) and a second clutch rotor (350) that rotates in response to rotation of the shaft (302).

5. The lubrication system (300) of claim 4, wherein the second clutch rotor (350) is connected to the shaft (302) such that the second clutch rotor (350) is able to slide axially along the shaft (302).

6. The lubrication system (300) of claim 5, wherein the second clutch rotor (350) slides axially into engagement with the first clutch rotor (340) to define the engaged position of the clutch assembly (330) and slides axially out of engagement with the first clutch rotor (340) to define the disengaged position of the clutch assembly (330).

7. The lubrication system (300) of claim 5, wherein the actuator is an electromagnetic coil (370) that is operable to produce a magnetic field when energized, at least part of the second clutch rotor (350) is formed from a ferromagnetic material, and energization of the electromagnetic coil (370) causes the second clutch rotor (350) to slide axially into engagement with the first clutch rotor (340).

8. The lubrication system (300) of claim 5, wherein the biasing element (360) applies the spring force to the second clutch rotor (350).

9. The lubrication system (300) of claim 5, wherein the actuator is an electromagnetic coil (370) that is operable to produce a magnetic field when energized and the electromagnetic coil (370) is connected to the first clutch rotor (340).

10. The lubrication system (300) of claim 9, wherein energization of the electromagnetic coil (370) causes the second clutch rotor (350) to slide axially into engagement with the first clutch rotor (340).

11. The lubrication system (300) of claim 1, wherein the pump (310) is a gerotor pump.

12. The lubrication system (300) of claim 11, wherein the one or more pumping elements (318) include an inner rotor (318) and an outer rotor (320).

13. A lubrication system (300) for a transfer case (120, 200), comprising:
a shaft (302) having a lubricant inlet port (306) and a hollow bore (304) for transporting lubricant within the shaft (302);
a pump (310) having a pump housing (312) and one or more pumping elements (318) that are disposed in the pump housing (312);
a clutch assembly (330) having an engaged position in which rotational force from the shaft (302) is transferred to the one or more pumping elements (318) to cause operation of the pump (310) and a disengaged position in which rotational force from the shaft (302) is not transferred to the one or more pumping elements (318), wherein the clutch assembly (330) includes a first clutch rotor (340) that is disposed on the shaft (302) and is connected to the one or more pumping elements (318) such that rotation of the first clutch rotor (340) causes operation of the one or more pumping elements (318) of the pump (310), and a second clutch rotor (350) that rotates in response to rotation of the shaft (302), and the second clutch rotor (350) is connected to the shaft (302) such that the second clutch rotor (350) is able to slide axially along the shaft (302);
an actuator (370, 410) that is operable to cause the clutch assembly (330) to move between the engaged position and the disengaged position; and
a biasing element (360) that is operable to apply a spring force to the second clutch rotor (350), wherein the biasing element (360) urges the second clutch rotor (350) away from engagement with the first clutch rotor (340).

14. The lubrication system (300) of claim 13, wherein the biasing element (360) is disposed on the shaft (302) in engagement with the second clutch rotor (350).

15. A transfer case (120, 200) for a vehicle, comprising:
a primary shaft assembly having an input shaft (204) and a primary output shaft (206), the primary shaft assembly having a hollow bore (244), at least one input port (246) in communication with the hollow bore (244), and at least one outlet port (248) in communication with the hollow bore (244);
a secondary output shaft (208);
a transfer clutch (252) that is operable to transfer power from the primary shaft assembly to the secondary output shaft (208) when the transfer clutch (252) is in an engaged position;
a pump (310) having a pump housing (312) and one or more pumping elements (318) that are disposed in the pump housing (312);
a pump clutch assembly (330) having an engaged position in which rotational force from the primary shaft assembly is transferred to the one or more pumping elements (318) to cause operation of the pump (310), and a disengaged position in which rotational force from the primary shaft assembly is not transferred to the one or more pumping elements (318), wherein the pump clutch assembly (330) includes a first clutch rotor (340) that is disposed on the primary shaft assembly and is connected to the one or more pumping elements (318) such that rotation of the first clutch rotor (340) causes operation of the one or more pumping elements (318) of the pump (310) and a second clutch rotor 350 that rotates in response to rotation of the primary shaft assembly;
a biasing element (360) that is operable to apply a spring force to the second clutch rotor (350), wherein the biasing element (360) urges the second clutch rotor (350) away from engagement with the first clutch rotor (340); and
an electromagnetic coil (370) that is operable to produce a magnetic field when energized to cause the pump clutch assembly (330) to move between the engaged position and the disengaged position, wherein the electromagnetic coil (370) is connected to the first clutch rotor (340), at least part of the second clutch rotor (350) is formed from a ferromagnetic material, the second clutch rotor (350) slides axially into engagement with the first clutch rotor (340) to define the engaged position of the pump clutch assembly (330) in response to energization of electromagnetic coil (370) and slides axially out of engagement with the first clutch rotor (340) in response to de-energization of the electromagnetic coil to define the disengaged position of the pump clutch assembly (330).

\* \* \* \* \*